(12) United States Patent
O'Kane et al.

(10) Patent No.: US 10,117,484 B1
(45) Date of Patent: Nov. 6, 2018

(54) ELECTRONIC TOY BANK

(71) Applicant: VISA INTERNATIONAL SERVICE ASSOCIATION, San Francisco, CA (US)

(72) Inventors: Christopher O'Kane, Belfast (GB); William McGorman, Belfast (GB); Peter Lennon, Foster City, CA (US); Samuel Wallace, Belfast (GB)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 15/492,956

(22) Filed: Apr. 20, 2017

(51) Int. Cl.
*A45C 1/12* (2006.01)
*H04L 29/08* (2006.01)
*A63H 33/26* (2006.01)

(52) U.S. Cl.
CPC ............... *A45C 1/12* (2013.01); *H04L 67/12* (2013.01)

(58) Field of Classification Search
CPC .. A45C 1/00; A45C 1/12; A63H 33/00; A63H 33/26; G09B 19/18
USPC ................. 446/8–13, 71, 73, 484; 434/110
See application file for complete search history.

(56) References Cited

U.S. PATENT DOCUMENTS

| 6,454,570 | B1 | 9/2002 | Woods |
| 2007/0290032 | A1 | 12/2007 | Main |
| 2009/0149106 | A1* | 6/2009 | D'Alleva ................. A45C 1/12 446/8 |
| 2009/0176432 | A1* | 7/2009 | Hardin ................... A45C 1/12 446/8 |
| 2012/0244776 | A1* | 9/2012 | Burns .................... A45C 1/12 446/8 |
| 2017/0055655 | A1 | 3/2017 | Meyers et al. |

FOREIGN PATENT DOCUMENTS

JP    2016535865    11/2016

OTHER PUBLICATIONS

PCT/US2018/027832, "International Search Report and Written Opinion", dated Jul. 31, 2018, 12 pages.

* cited by examiner

*Primary Examiner* — Kien Nguyen
(74) *Attorney, Agent, or Firm* — Kilpatrick Townsend & Stockton LLP (57) ABSTRACT

The invention is directed to an electronic toy bank. The electronic toy bank may be utilized by a child to learn how to manage funds corresponding to an external account and may also be associated with a payment device operated by a child. The child may utilize a transfer device to communicate information to the electronic toy bank, where the information can indicate an amount to be transferred from a first external account to a second external account associated with the child. Upon authorization of the transfer, the electronic toy bank may send instructions to a remote server computer to update information associated with the first external account and the second external account according to the amount. The electronic toy bank can update information displayed on its display screen to reflect a balance associated with an external account, allowing the child to easily see their current savings.

20 Claims, 5 Drawing Sheets

ELECTRONIC TOY BANK

CROSS-REFERENCES TO RELATED APPLICATIONS

None.

BACKGROUND

Traditional toy banks are utilized to store cash and may help users, such as children, learn about saving cash. While managing cash is a useful skill, this is just one aspect of money management. In reality, there are additional aspects of money management that are also important to learn. For example, additional aspects include management of different types of currency, such as digital currency, and exposure to various payment devices, such as payment cards. However, conventional toy banks are not capable of enabling users to experience these additional aspects of money management.

Traditional toy banks also present other issues. One issue is that the user can only conduct cash transactions based on their savings, which is limiting. Another issue is that traditional toy banks do not provide users convenient access to their saved money. For example, most of the time, a user may not have their saved cash with them. Thus, even if a user is interested in utilizing their savings to conduct a transaction, they may not be able to get the necessary money if their toy bank is in a remote location (e.g., at home). Further, conventional toy banks tend to accumulate small change (e.g., coins), which is inconvenient to carry around and utilize for payments.

Embodiments of the invention address these and other problems, individually and collectively.

BRIEF SUMMARY

One embodiment of the invention is directed to an electronic toy bank. The electronic toy bank may take any suitable form. For example, the electronic toy bank may be in the form of an animated character or animal. The electronic toy bank can comprise a housing, a processor embedded in the housing, a display screen coupled to the processor, a sensor coupled to the processor, a network interface coupled to the processor, and a memory coupled to the processor. In some embodiments, the housing may comprise a soft or plush surface. In other embodiments, the housing may comprise a hard surface. The memory may comprise code executable to perform any of the methods described herein. The display screen may be configured to display information corresponding to a payment device associated with the electronic toy bank. In some embodiments, the payment device may be a prepaid card. The sensor may be configured to sense when a transfer device is proximate to the housing and determine data including an amount from the transfer device. In some embodiments, the transfer device may be a NFC device. The network interface may be configured to communicate with a remote server computer. The memory may be programmed to cause the electronic toy bank to send instructions to the remote server computer to update an external account according to the amount. In some embodiments, the electronic toy bank may further comprise a speaker coupled to the processor and configured to play a sound, such as the sound of coins dropping, when the sensor senses the transfer device.

In some embodiments, the external account may be a first external account. In some cases, the memory may be programmed to cause the electronic toy bank to further send instructions to update a second external account associated with the payment device. In some cases, the memory may be programmed to cause the electronic toy bank to debit the amount from the first external account and increase a balance corresponding to the second external account by the amount so that the payment device is associated with an updated balance. In some cases, the memory may be programmed to display the updated balance associated with the payment device on the display screen.

In some embodiments, the amount may be a first amount and the updated balance may be a first updated balance. In some cases, the memory may be programmed to receive a second updated balance when a transaction of a second amount is conducted using the payment device and display the second updated balance on the display screen. The second updated balance may be the result of the first updated balance associated with payment device being decreased by the second amount.

In some embodiments, the housing of the electronic toy bank may comprise an interior storage compartment for cash and a slot configured to receive the cash. In some embodiments, the memory may be programmed to display the total amount of cash in the interior storage compartment on the display screen.

Embodiments of the invention are also directed to method for using an electronic toy bank. The method may comprise sensing, by a sensor of an electronic toy bank, that a transfer device is proximate. The method may further comprise determining, by the electronic toy bank, data including an amount from the transfer device. The method may further comprise sending, by a network interface of the electronic toy bank, instructions to a remote server computer to update an external account according to the amount. The method may further comprise displaying, by a display screen of the electronic toy bank, information corresponding to a payment device associated with the electronic toy bank. In some cases, the payment device may be a prepaid card. In some embodiments, the method may further comprise playing, by a speaker of the electronic toy bank, a sound when the sensor senses that the transfer device is proximate.

In some embodiments, the external account may be a first external account. The method may further comprise sending, by the electronic toy bank, instructions to update a second external account associated with the payment device. The method may further comprise sending, by the electronic toy bank, instructions to debit the amount from the first external account. The method may further comprise sending, by the electronic toy bank, instructions to increase a balance corresponding to the second external account by the amount so that the payment device is associated with an updated balance. In some cases, the method may further comprise displaying, by the electronic toy bank, the updated balance associated with the payment device on the display screen. In some cases, the data on the transfer device may be input using a user device operated by a user that is associated with the first external account.

In some embodiments, the amount may be a first amount and the updated balance may be a first updated balance. The method may further comprise receiving, by the electronic toy bank from the remote server computer, an indication that a transaction of a second amount was conducted using the payment device. The first updated balance may be decreased by the second amount resulting in a second updated balance associated with the payment device. The method may further comprise receiving, by the electronic toy bank from the remote server computer, the second updated balance associated with the payment device. The method may further comprise displaying, by the display screen of the electronic toy bank, the second updated balance associated with the payment device.

In one embodiment, the electronic toy bank may include a housing comprising an interior storage compartment and a slot. The method may further comprise receiving, by the interior storage compartment, cash inserted through the slot. The method may further comprise determining, by the electronic toy bank, the total amount of cash in the interior storage compartment. The method may further comprise displaying, by the electronic toy bank, the total amount of cash in the interior storage compartment on the display screen.

In another embodiment, the electronic toy bank may include a housing comprising an interior storage compartment and a slot. The method may further comprise receiving, by the interior storage compartment, cash inserted through the slot. The method may further comprise determining, by the electronic toy bank, the amount of cash inserted through the slot. The method may further comprise sending, by the electronic toy bank, the amount of cash to the remote server computer. The remote server computer may determine an updated balance associated with the payment device according to the amount of cash. The method may further comprise receiving, by the electronic toy bank, the updated balance associated with the payment device from the remote server computer. The method may further comprise displaying, by the display screen, the updated balance associated with the payment device.

DETAILED DESCRIPTION

Embodiments of the invention are directed to an electronic toy bank. In contrast with conventional toy banks, the electronic toy bank allows users (e.g., children) to learn about other aspects of money management besides saving cash. For example, using the electronic toy bank allows users to manage other types of currency, such as digital currency. Additionally, using the electronic toy bank allows users to be exposed to various payment devices, such as payment cards, and payment methods, such as online payments.

The electronic toy bank can solve issues of conventional toy banks. Some of these issues may include that the user is limited to conducting cash transactions based on their savings and that users do not get convenient access to their saved money. For example, even if a user is interested in utilizing their savings to conduct a transaction, they may not be able to access their toy bank if it is in a remote location (e.g., at home). Another issue is that traditional toy banks tend to accumulate small change (e.g., coins), which is inconvenient to carry around and utilize for conducting transactions.

The electronic toy bank can comprise a housing, a processor embedded in the housing, a display screen coupled to the processor, a sensor coupled to the processor, a network interface coupled to the processor, and a memory coupled to the processor. The memory may comprise code executable to perform any of the methods described herein. The electronic toy bank may be in communication with other devices. In some embodiments, the electronic toy bank may be in communication with a remote server computer (e.g., service provider computer) that may be capable of processing instructions from the electronic toy bank. In some cases, the remote server computer may manage information associated with one or more external accounts. The electronic toy bank may also be capable of communicating with a transfer device. In some implementations, the electronic toy bank and transfer device may communicate wirelessly, such as by near-field communication.

In some embodiments, the memory may be programmed to cause the electronic toy bank to send instructions to a remote server computer to update an external account. For example, based on data read from a transfer device (e.g., NFC device), the electronic toy bank may send instructions to debit an amount from a first external account and add it to a balance associated with a second external account. The first external account may correspond to a first user and the second external account may correspond to a payment device (e.g., prepaid card) operated by a second user (e.g., dependent).

In an exemplary flow, a first user associated with a first external account may utilize their user device to input data to a transfer device. For example, the first user may enter information into an application on their user device to indicate an amount to be added to a second external account associated with a payment device operated by a second user. The information may then be associated with the transfer device, which can be provided to the second user. The second user may wave the transfer device in proximity of the electronic toy bank, which can then read the information including the amount from the transfer device and send instructions to a remote server computer to add the amount to the second external account. The payment device may now be associated with an updated balance according to the added amount. The second user may utilize the payment device to conduct a transaction.

Before discussing specific embodiments of the invention, some descriptions of some terms may be useful.

A "computing device" may be any suitable electronic device that can process and communicate information to other electronic devices. The computing device may include a processor and a computer readable medium coupled to the processor, the computer read able medium comprising code, executable by the processor. The computing device may also include input devices and output devices that are operatively coupled to the processor, as well as an external communication interface for communicating with other computing devices or other entities. For example, the computing device can provide remote communication capabilities to a network. Examples of these remote communication capabilities include using a mobile phone (wireless) network, wireless data network (e.g. 3G, 4G or similar networks), Wi-Fi™, Bluetooth, Bluetooth Low Energy (BLE), Wi-Max, or any other communication medium that may provide access to a network such as the Internet or a private network.

Some exemplary types of computing device may include a mobile device, a cardholder device, a user device, a consumer device, a server computing device, an appliance, and any computer. Some non-limiting examples of mobile devices include mobile phones (e.g., cellular phones), keychain devices, personal digital assistants (PDAs), pagers, notebooks, laptops, notepads, net books, tablet computers, wearable devices (e.g., smart watches, fitness bands, jewelry, etc.), automobiles or motorcycles with remote communication capabilities, person music player devices, personal computers, hand-held specialized readers, and the like.

A "transfer device" may be any suitable computing device that can communicate information with other computing devices. In some embodiments, the transfer device may enable two-way communication, so that it can send information to other devices, as well as receive information from other devices. The transfer device may typically include a contactless interface (e.g., NFC interface) for establishing wireless short-range connectivity and communicating information with other devices over the established connection. In some embodiments, the transfer device may be a handheld device that is capable of storing or communicating information, such as a key fob, keychain device, or wearable device (e.g., smart watches, fitness bands, jewelry, etc.). In some cases, the transfer device may take a form that enables use by a child. For example, the transfer device may be a key chain device that takes the form of an animal, character, doll, toy, or other child-friendly entity. Additionally, the transfer device may be a key chain device that takes the form of currency (e.g., coin or bill) or a bank note to draw a relation to the financial contexts of money management.

A "server computer" may include any suitable computer that can provide communications to other computers and receive communications from other computers. A server computer may include a computer or cluster of computers. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

Messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 1:
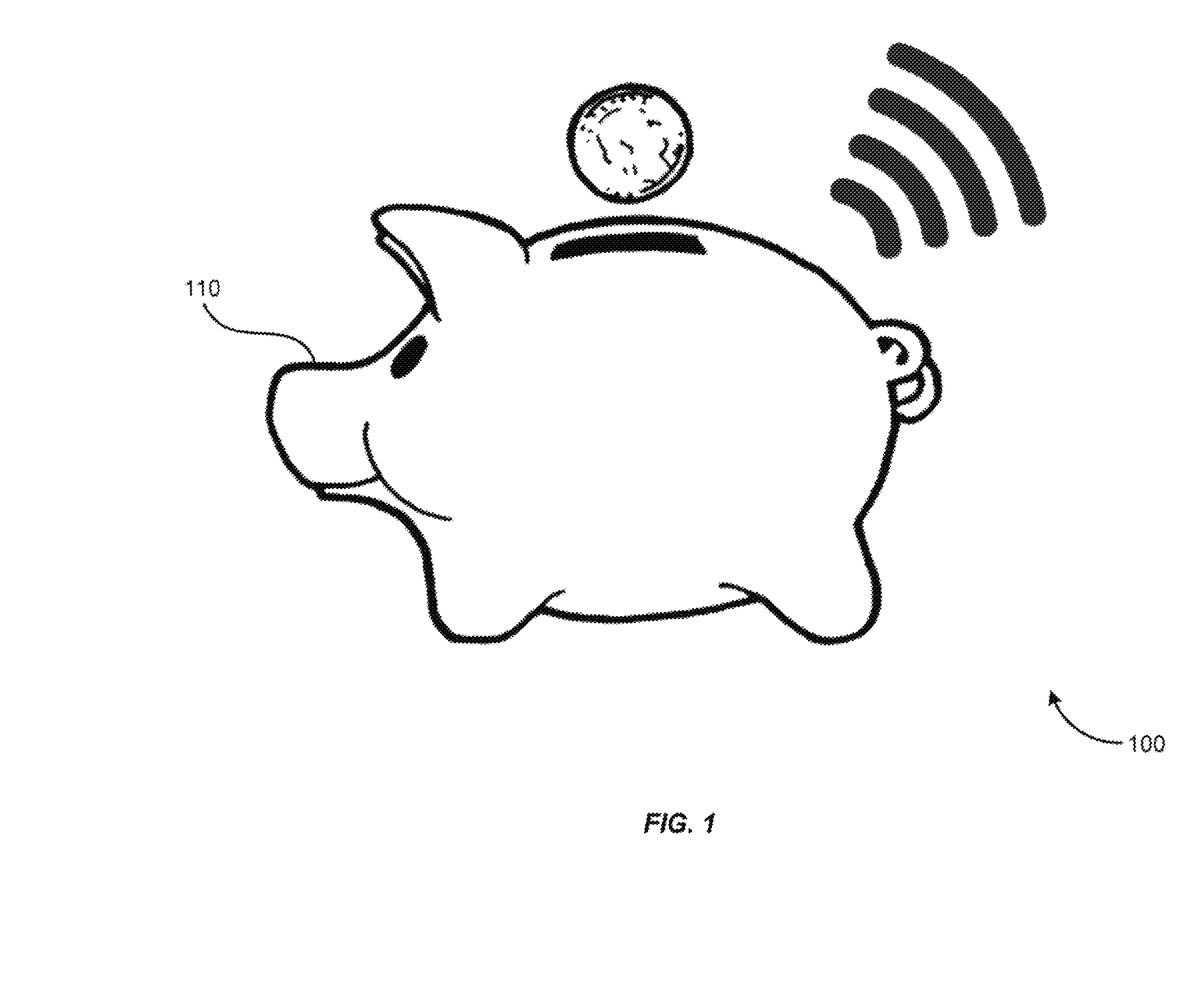
FIG. 1 shows an exemplary electronic toy bank according to some embodiments of the invention.

FIG. 1 shows an exemplary electronic toy bank 100 according to some embodiments of the invention. Electronic toy bank 100 may include a housing 110. Housing 110 may be made of any suitable size. In some embodiments, housing 110 may be large enough such that it can house various electronics (e.g., for wireless communication) or an interior storage compartment for storing cash. In some cases, housing 110 may be a suitable size to enable easy handling by a child. For example, the size of housing 110 may be comparable to the size of a stuffed animal that can be held.

While FIG. 1 shows one exemplary case in which housing 110 is in the shape of a pig, embodiments are not so limited as housing 110 may be of any suitable shape. For example, in some embodiments, housing 110 may take the form of any animal, character, doll, mascot, or other figure. In other embodiments, housing 110 may be a three-dimensional shape, such as a rectangular prism, a triangular prism, a hexagonal prism, a pyramid, a cylinder, a cone, a sphere, or other suitable shape.

Housing 110 may be made of any suitable material. In some embodiments, housing 110 may comprise a hard surface that may be made of plastic, ceramic, metal, wood, glass, or other suitable material. In other embodiments, housing 110 may be comprise a soft or plush surface that may be made of cloth, fabric, yarn, felt, or other suitable material. In such cases, electronic toy bank 100 may look similar to a stuffed animal or doll.

Figure 2:
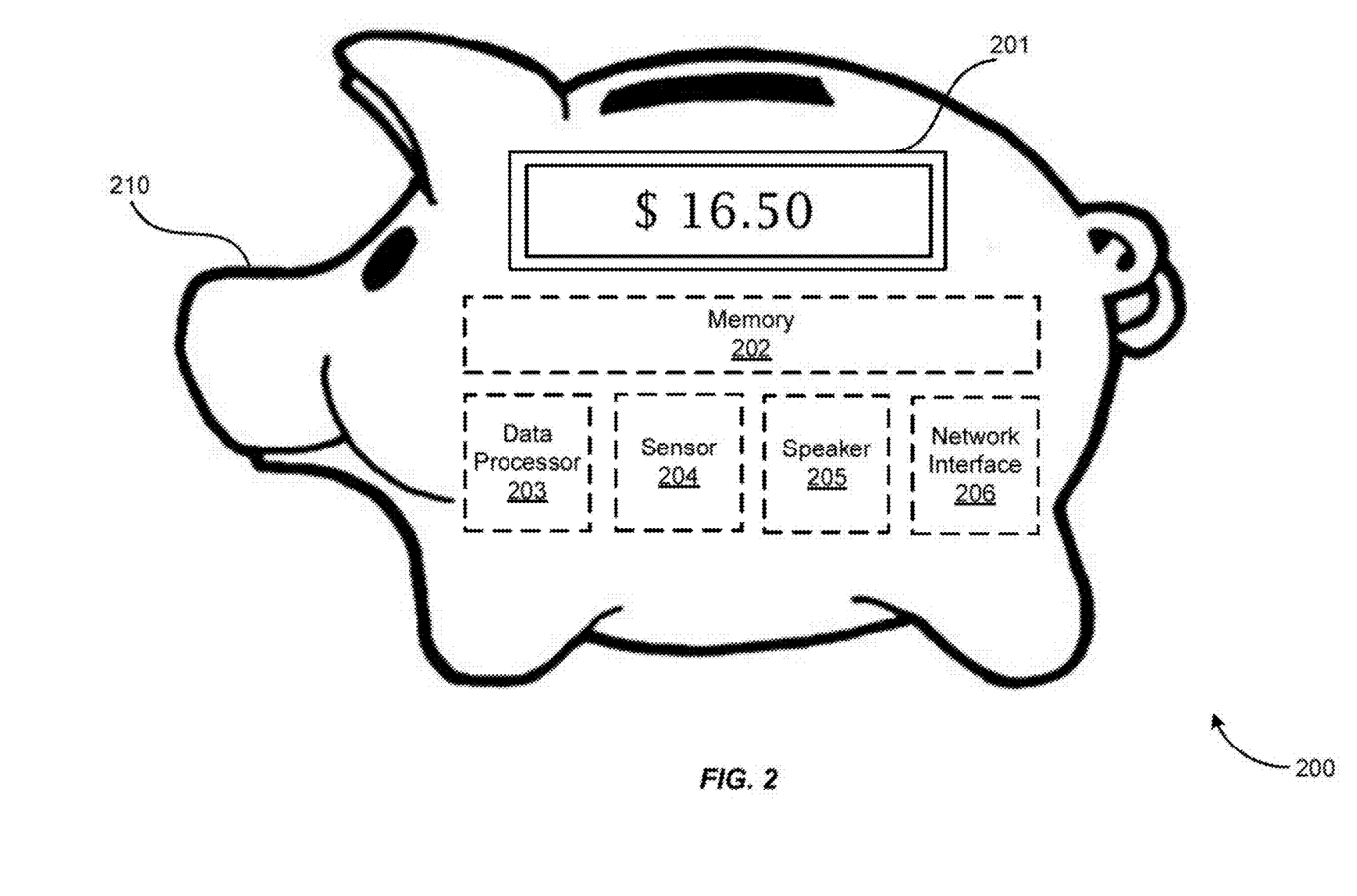
FIG. 2 shows exemplary components of an electronic toy bank according to some embodiments of the invention.

FIG. 2 shows exemplary components of an electronic toy bank 200 according to some embodiments of the invention. Electronic toy bank 200 may comprise a housing 210, which may include similar features to those described for housing 110 in FIG. 1. Electronic toy bank 200 may also comprise a display 201, a memory 202, a data processor 203, a sensor 204, a speaker 205, and a network interface 206. Any of the these components of electronic toy bank 200 may be embedded within housing 210 or attached to housing 210 in any suitable manner. While various components included in FIG. 2 are shown to be separate components, embodiments are not so limited. For example, some of the components can be combined. Additionally, any of the components shown can be split into sub-systems.

Data processor 203 may include hardware that carries out instructions embodied as code in memory 202. In some cases, data processor 203 may be a central processing unit (CPU). Data processor 203 may include a single-core processor, a plurality of single-core processors, a multi-core processor, a plurality of multi-core processors, or any other suitable combination of hardware configured to perform arithmetical, logical, and/or input/output operations of electronic toy bank 200.

Memory 202 may include any suitable media for containing code, or portions of code. Memory 202 may include volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Display 201 may include hardware that can show information to a user. In some cases, display 201 may include a screen and may be embedded on housing 210 such that the screen faces the exterior of electronic toy bank 200. Display 201 may show any suitable information, such as any combination of text, numbers, symbols, characters, pictures, or animations. In some embodiments, display 210 may show a user interface comprising user interface elements, such as menus, text fields, icons, and keys/inputs on a virtual keyboard. In some cases, display 210 may enable touch functionality so that a user can select and interact with user interface elements presented on display 201 with their finger or suitable touch screen stylus pen. Display 201 may also be capable of displaying colors. Information shown on display 201 may be periodically updated automatically, or may be updated based on manual input by a user (e.g., activation of button or user interface element). Typically display 201 may display a balance (e.g., "$16.50") associated with a payment device (e.g., prepaid card) operated by a user of electronic toy bank 200.

Sensor 204 may be a device for detecting another computing device. In some embodiments, sensor 204 may comprise a contactless communication interface that can be utilized to determine when a transfer device (e.g., hand-held device) is in proximity with housing 210. For example, sensor 204 may enable short-range wireless connectivity to enable communication (e.g., read/write) between electronic toy bank 200 and the transfer device when the transfer device touches or is held in close range (e.g., within a few centimeters) of electronic toy bank 200. Sensor 204 may include an antenna and other digital circuity that enables inductive coupling to send and receive signals.

Speaker 205 may be any suitable device that can produce sound in response to an electrical audio signal. Speaker 205 may be able to play prerecorded sounds or messages. In some embodiments, the volume of sound emitted by speaker 205 may be controlled by a volume control element (e.g., button, knob, etc.) or by activating user interface elements displayed by display 201.

Network interface 206 may be any suitable combination of hardware and software that enables data to be transferred to and from electronic toy bank 200. Network interface 206 may enable electronic toy bank 200 to communicate data to and from another device, such as a remote server computer. Some examples of network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 206 may include Wi-Fi™.

Data transferred via network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
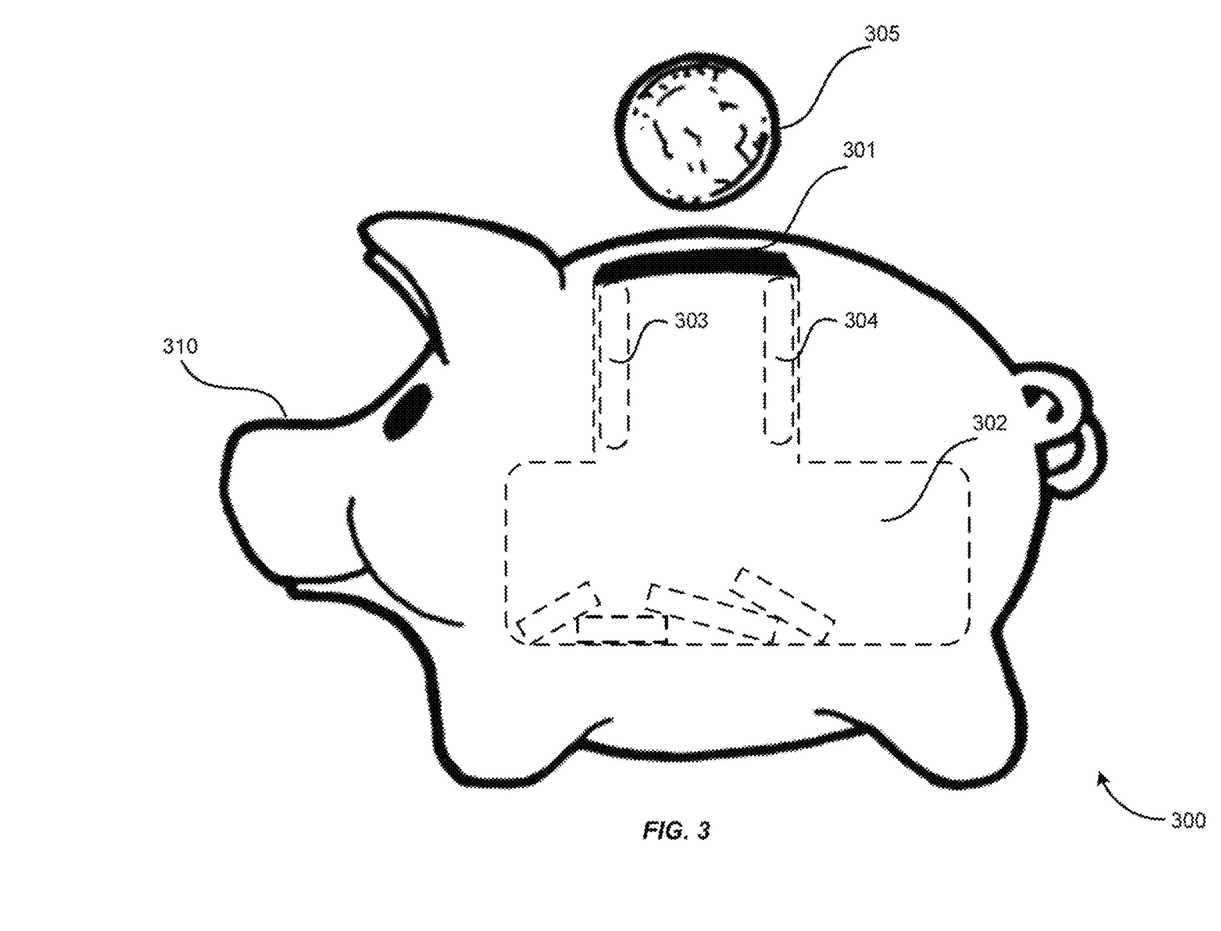
FIG. 3 shows an exemplary components of an electronic toy bank according to some embodiments of the invention.

FIG. 3 shows exemplary components of an electronic toy bank 300 according to some embodiments of the invention. Electronic toy bank 300 may comprise a housing 310, which may include similar features to those described for housing 110 in FIG. 1. Electronic toy bank 300 may also comprise a slot 301 leading into an interior storage compartment 302, and detection devices 303 and 304. While various components included in FIG. 3 are shown to be separate components, embodiments are not so limited. For example, some of the components can be combined. Additionally, any of the components shown can be split into sub-systems.

While FIG. 2 and FIG. 3 separately show different components that can be included in an electronic toy bank for clarity, it is understood that any of these components can be included in a single electronic toy bank. For example, electronic toy bank 200 can also comprise the components shown in electronic toy bank 300, while electronic toy bank 300 can also comprise the components shown in electronic toy bank 200.

Slot 301 may be an opening in housing 310. In some embodiments, slot 301 may be a hole through which cash can be inserted into interior storage compartment 302. Slot 301 may thus be any suitable size such that coins and bills can fit through it. For example, as shown in FIG. 3, slot 301 may be a size that is sufficient to enable a coin 305 to pass through it and travel downwardly into interior storage compartment 302.

Interior storage compartment 302 may be a hollow area within housing 310. Interior storage compartment 302 may provide space to store cash that is inserted through slot 301. In some embodiments, interior storage compartment 302 may comprise walls that form any suitable shape within housing 310, such as a prism, a sphere, or a combination of multiple shapes. While not explicitly shown in FIG. 3, in some embodiments, interior storage compartment 302 may comprise a mechanism that enables discharging of the cash stored inside, such as a cap that can be opened to reveal a hole on the underside of housing 310.

Detection devices 303 and 304 may be devices that can detect currency that is inserted into slot 301. Detection devices 303 and 304 may determine the type of coin or bill based on detecting one or more of weight, size, composition, or magnetism properties. In some embodiments, detection devices 303 and 304 may comprise optical or magnetic sensors. In some implementations, detection devices 303 and 204 may be able to detect the type of coins or bills being inserted into slot 301, which can be communicated to the data processor (e.g., data processor 203) of electronic toy bank 300. This can enable electronic toy bank 300 to monitor the total change stored within interior storage compartment 302.

While FIG. 3 shows one exemplary placement of detection devices 303 and 304, embodiments are not so limited. In other cases, detection devices 303 and 304 may be located elsewhere in interior storage compartment 302 based on the detection mechanism. Additionally, in some cases, electronic toy bank 300 may include only one detection device or more than two detections devices.

Figure 4:
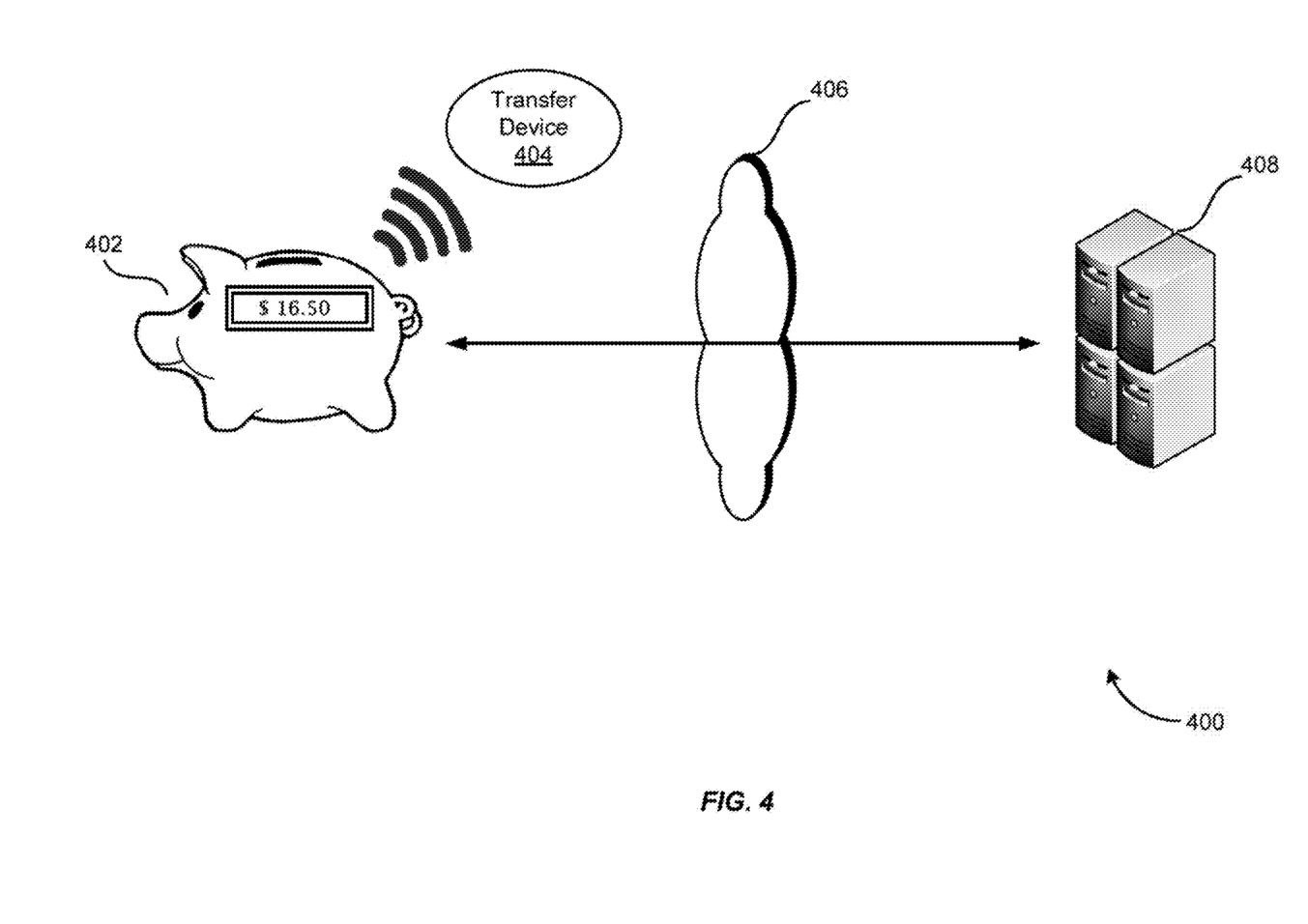
FIG. 4 shows an exemplary system according to some embodiments of the invention.

FIG. 4 shows an exemplary system 400 according to some embodiments of the invention. System 400 includes an electronic toy bank 402 in communication with a remote server computer 408 over a communications network 406. System 400 also includes a transfer device 404 that may communicate with electronic toy bank 402 using a near-field communication protocol. Electronic toy bank 402 may comprise similar features to those discussed with respect to FIG. 1, FIG. 2, and FIG. 3.

Transfer device 404 may be any suitable computing device that can communicate information with other computing devices. In some embodiments, transfer device 404 may be capable of transmitting or receiving information using a near-field communications (NFC) protocol. Typically, transfer device 404 may be a portable device (e.g., key fob, wearable device, etc.) that a user can carry in proximity to another computing device, such as electronic toy bank 402 or another user device. Data associated with transfer device 404 may be updated in any suitable manner. In some embodiments, the user may indicate using a their user device to update information associated with transfer device 404 based on inputting a device identifier associated with transfer device 404 into a mobile application. In other embodiments, transfer device 404 may receive information over NFC from the user device running the mobile application.

Remote server computer 408 may be a server computer that facilitates information between entities. For example, remote server computer 408 may transfer information received from electronic toy bank 402 to other transaction processing entities (e.g., a payment processing server computer, authorization computer, etc.), as well as transfer information received from other transaction processing entities to electronic toy bank 402. In some embodiments, when information is updated by electronic toy bank 402, such as when an amount is added to the balance, remote server computer 408 may receive the updated information and store the updated information. Remote server computer 408 may also communicate updated information to electronic toy bank 402, such as when a transaction is conducted utilizing the payment device associated with electronic toy bank 402. Remote server computer 408 may also host an application that can be utilized by a user to add an amount to a transfer device.

Remote server computer 408 may also store information related to electronic toy bank 402 as well as information related to a payment device (e.g., card) associated with electronic toy bank 402. For example, remote server computer 408 may store information indicating the association between electronic toy bank 402 and the payment device. Remote server computer 407 may also store identification information (e.g., account identifier) of the payment device, a balance associated with the payment device, and transaction history information associated with the payment device.

In some embodiments, remote server computer 408 may be a server computer that can be utilized for payment processing. In some implementations, remote server computer 408 may be coupled to a database and may include any hardware, software, other logic, or combination of the preceding for servicing the requests from one or more client computers. Remote server computer 408 may comprise one or more computational apparatuses and may use any of a variety of computing structures, arrangements, and compilations for servicing the requests from one or more client computers. In some embodiments, remote server computer 408 may operate multiple server computers. In such embodiments, each server computer may be configured to process transaction for a given region or handles transactions of a specific type based on transaction data.

In some embodiments, remote server computer 408 may include data processing subsystems, networks, and operations used to support and deliver authorization services, exception file services, and clearing and settlement services. An exemplary payment processing server computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing server computer may use any suitable wired or wireless network, including the Internet.

In some cases, remote server computer 408 may process transaction-related messages (e.g., authorization request messages and authorization response messages) and determine the appropriate destination computer for the transaction-related messages. In some embodiments, the payment processing server computer may authorize transactions on behalf of an authorization computer. Remote server computer 408 may also handle and/or facilitate the clearing and settlement of financial transactions.

Communications network 406 may be any suitable network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, Bluetooth, and/or the like); and/or the like.

Figure 5:
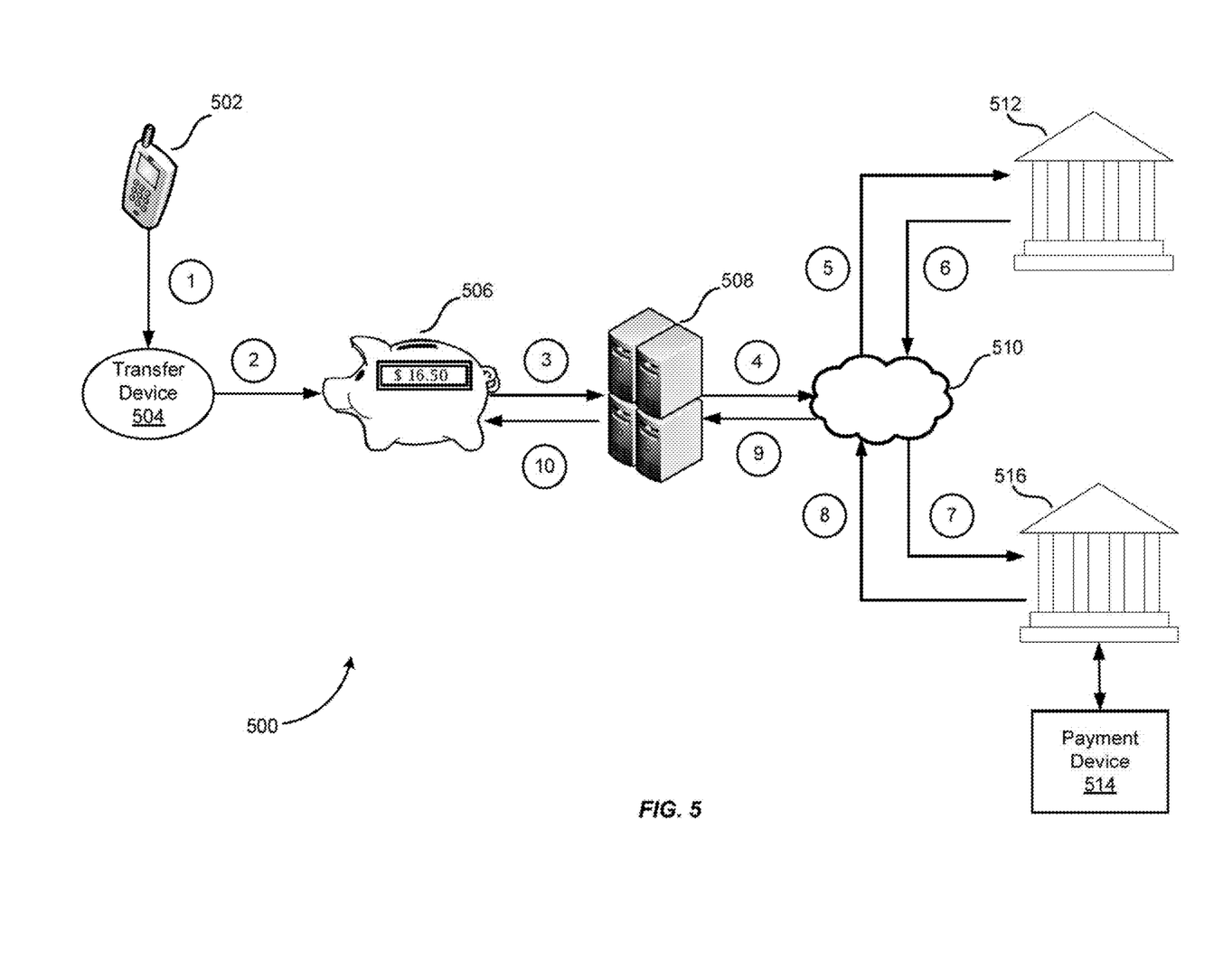
FIG. 5 shows an exemplary system and flow for utilizing the electronic toy bank according to some embodiments of the invention.

FIG. 5 shows an exemplary system 500 according to some embodiments of the invention. System 500 includes a user device 502, a transfer device 504, an electronic toy bank 506, a remote server computer 508, a service provider network 510, an authorization entity server computer 512, an authorization entity server computer 516, and a payment device 514. While various components included in FIG. 5 are shown to be separate components, embodiments are not so limited. In some implementations, some of the components can be combined. Additionally, any of the components shown can be split into sub-systems.

Some components shown in FIG. 5 are not explicitly described for brevity. However, it is understood that they may comprise similar features to those corresponding components shown in other figures described herein. For example, transfer device 504 may include similar features to those described with respect to transfer device 404 of FIG. 4 and remote server computer 508 may include similar features to those described with respect to remote server computer 408 of FIG. 4. Additionally, electronic toy bank 506 may include similar features to those described with respect to electronic toy bank 100 of FIG. 1, 200 of FIG. 2, 300 of FIG. 3, or 402 of FIG. 4.

User device 502 may be a computing device operated by a user. User device 502 may be any suitable computing device that can run an application hosted by remote server computer 508. In some cases, user device 502 may be a mobile device that the user can carry in proximity to transfer device 504. User device 502 may comprise device hardware including a data processor, a display, a network interface, and a computer-readable medium.

Service provider network 510 may enable online services and may be operated by a service provider computer. Any actions described herein with respect to service provider network 510 may be understood to be performed by the service provider computer operating service provider network 510. In some embodiments, service provider network 510 may provide an Application Program Interface (API) for facilitating information between entities. For example, the API may be utilized to transfer information between remote server computer 508 and other entities, such as electronic toy bank 506, authorization entity server computer 512, and payment device 514. In some cases, the API may enable instructions for initiating an action, such as debiting an amount from an account, adding an amount to a balance, authorizing a request, and other suitable actions. In some embodiments, remote server computer 508 and service provider network 510 may be enabled by the same server computer.

Authorization entity server computer 512 may be a server computer that is operated by an authorization entity. In some embodiments, authorization entity server computer 512 may be an access device, a terminal device, or a web server computer hosting an Internet website. However, authorization entity server computer 512 may include any device capable of accessing the Internet, such as a personal computer, cellular or wireless phones, personal digital assistants (PDAs), tablet PCs, and handheld specialized readers.

In some embodiments, the authorization entity associated with authorization entity server computer 512 may be an institution (e.g., bank) that provides authorization services for transactions. The authorization entity may also issue accounts, as well as payment devices associated with the issued accounts. In this exemplary case, authorization entity server computer 512 may issue the first external account associated with the first user. Authorization entity server computer 512 may thus store account information (e.g., account identifier, authentication information, passwords, transaction history, account balance, etc.) associated with the first external account in its systems.

Authorization entity server computer 516 may comprise similar characteristics to those described for authorization entity server computer 516. However, in this exemplary case, the authorization entity operating authorization entity server computer 516 may issue the second external account associated with first user, as well as payment device 514 associated with the second external account. Authorization entity server computer 516 may thus store account information (e.g., account identifier, authentication information, passwords, transaction history, account balance, etc.) associated with the second external account in its systems.

Payment device 514 may be any suitable device capable of conducting payment transaction. In some embodiments, payment device 514 may be a card, such as a prepaid card, a credit card, or a debit card. In some embodiments, the card may be issued by the authorization entity associated with authorization entity server computer 516. In other embodiments, payment device 514 may be a computing device that can be associated with a digital wallet. Examples of such computing devices include mobile phones (e.g., cellular phones), keychain devices, personal digital assistants (PDAs), pagers, notebooks, laptops, notepads, net books, tablet computers, wearable devices (e.g., smart watches, fitness bands, jewelry, etc.), automobiles or motorcycles with remote communication capabilities, person music player devices, personal computers, hand-held specialized readers, and the like. In some embodiments, payment device 514 may be associated with electronic toy bank 506.

An exemplary method is described with respect to FIG. 5. While one exemplary flow is described below, several of the steps may be performed in a different order as described or in parallel. It is understood that additional methods and processes may be included within the described method and may be recognized by one of ordinary skill in the art, in light of the description below. Further, in some embodiments of the present invention, any of the described methods herein may be combined, mixed, and matched, as one of ordinary skill would recognize.

Some time prior to step 1, a registration process may be performed. In some embodiments, a first user that operates user device 502 may conduct the registration process by creating a mobile application account hosted by remote server computer 508. The registration process may be conducted using user device 502 or any other suitable computing device. The first user may register information related to their identity, electronic toy bank 506, a funding source, and payment device 514. For example, the first user may register a username, a password, a device identifier associated with electronic toy bank 506, account information (e.g., account identifier) of a first external account, and account information (e.g., account identifier) of payment device 514 associated with a second external account. In some embodiments, remote server computer 508 may tokenize the account information associated with the first external account and the account information associated with the second external account. The information registered by the first user, including tokenized account information, may then be associated with the mobile application account operated by the first user. After the registration process has been completed, the first user may be able to use the mobile application to provide funds from the first external account to be utilized by payment device 514 associated with the second external account.

Tokenizing account information may comprise determining (e.g., generating) a token associated with account information. A token may include substitute information. In some embodiments, a token may be a string of numbers, letters, or any other suitable characters. For example, a payment token associated with a payment account may include an identifier for the payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing processing networks (e.g., ISO 8583 financial transaction message format).

In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

The token may be stored in a database (e.g., token database) at remote server computer 508 during the registration process. The database may be a conventional, fault tolerant, relational, scalable, secure database such as those commercially available from Oracle™ or Sybase™. The database may comprise information indicating the token and information associated with the token, such as the real account information for which the token includes substitute information. In some embodiments, the token may be associated with certain limitations, such as an expiration date, a designated number of valid uses, or spend limits.

Payment device 514 may be meant for use by a second user. Typically, the second user may be a dependent. For example, the first user may be a parent and the second user may be a child. However, the method can be applied to any users (e.g., employer and employee, first friend and second friend, resource providing entity and recipient entity, etc.) in which the first user is interested in providing funds for use by the second user. The first user may be able register payment device 514 as the recipient of funds as long as any information associated with payment device 514 to be input during registration is known. Thus, while in some cases, the first user may provide payment device 514 to the second user after conducting the registration process, in other cases, the second user may already possess payment device 514 before the registration process is conducted.

At step 1, the first user may utilize user device 502 to update information associated with transfer device 504. In this exemplary case, user device 502 may be a mobile device and transfer device 504 may be a NFC device. User device 502 may be running the mobile application for which they registered during the previous registration process. The first user may utilize the mobile application to provide funds from the first external account that they registered during the registration process. For example, the first user may determine an amount to be provided and then input the amount into the mobile application. In some cases, the first user may also input information into the mobile application identifying the first external account as the funding source and the second external account as the recipient of funds. In other cases, the designation of the funding source and recipient may be predetermined and thus the first user may not have to input this additional information.

Upon the first user bringing user device 502 in proximity to transfer device 504, user device 502 may wirelessly transmit information indicating the amount, tokenized account information of the first external account, and tokenized account information of the second external account to transfer device 504. The information received from user device 502 may be written to transfer device 504. The first user may provide transfer device 504 to the second user (e.g., dependent).

In some embodiments, remote server computer 508 may store information indicating activity of the first user utilizing the mobile application. For example, remote server computer 508 may store information indicating that the first user utilized the mobile application to request to provide the amount from the first external account to the second external account and that information indicating this request was transferred to transfer device 504. This information may later be utilized to verify information related to the request.

At step 2, transfer device 504 may transfer information to electronic toy bank 506. In some embodiments, the second user may bring transfer device 504 in proximity with electronic toy bank 506, which may sense, using its sensor, that transfer device 504 is proximate. In some cases, a speaker of electronic toy bank 506 may play a sound, such as the sound of coins dropping or spinning, indicating that it detected transfer device 504. Electronic toy bank 506 can then determine the information indicating the amount and tokenized account information upon reading the information from transfer device 504 using NFC. Electronic toy bank 506 may then initiate communication with remote server computer 508 to conduct an authentication process.

Certain actions may be taken to ensure that information written to transfer device 504 cannot be utilized more than once. In some implementations, transfer device 504 may be configured so that each time information from transfer device 504 is transferred to electronic toy bank 506, the information is deleted from transfer device 504. In other implementations, each cluster of data written to transfer device 504 including an amount that is requested to be transferred from the first external account to the second external account may be associated with a unique identifier generated by remote server computer 508. In an exemplary case, electronic toy bank 508 may receive a unique identifier along with a request for transfer of funds and send it to remote server computer 508, which can verify whether the request is valid based on the unique identifier. In some cases, the unique identifier may be generated based on any combination of information unique to the request, such as the timestamp corresponding to when the request was submitted, identification information of the requestor, or device identification information corresponding to the device from which the request was submitted.

While one exemplary flow in which transfer device 504 is utilized in steps 1 and 2, embodiments are not so limited. For example, in other implementations, user device 502 may be utilized to directly communicate with electronic toy bank 506 instead of utilizing transfer device 504 as an intermediary. For example, the first user may input information regarding transfer of an amount from the first external account to the second external account into the mobile application as described in step 1, and then transfer the information from user device 502 to electronic toy bank 506. In some embodiments, the information may be transferred in any suitable manner, such as through a wired communication or wireless communication (e.g., NFC, Bluetooth, Wi-Fi™, etc.). In some embodiments, the first user may be able to transfer the information to electronic toy bank 506 remotely so that it is not necessary to be in close proximity as electronic toy bank 506.

At step 3, electronic toy bank 506 may generate and send a request to remote server computer 508 to update the first external account and the second external account according to the amount. In some embodiments, the request may be sent with (e.g., include) information indicating the amount, tokenized account information associated with the first external account, and tokenized account information associated with the second external account. Upon receiving the request, remote server computer 508 may authenticate the request received from electronic toy bank 506. In some cases, remote server computer 508 may determine the mobile application corresponding to the first user associated with the first external account. Remote server computer 508 may then authenticate the request from electronic toy bank 506 by determining, based on previously stored information, that the first user utilized the mobile application to write information to transfer device 504 indicating to transfer the amount from the first external account to the second external account (See step 1).

In some embodiments, remote server computer 508 may de-tokenize the tokenized account information. Remote server computer 508 may perform the de-tokenization process by accessing the database (e.g., token database) storing information indicating a mapping between account information and tokenized account information of external accounts that was stored during registration. The tokenized account information associated with the first external account may include a first token including substitute information for an account identifier corresponding to the first external account. Similarly, the tokenized account information associated with the second external account may include a second token including substitute information for an account identifier corresponding to the second external account. Remote server computer 508 may determine information associated with the first token and second token stored in the database. Based on the information indicating the mapping, remote server computer 508 may determine that the first token is associated with account information corresponding to the first external account, and that the second token is associated with account information corresponding to the second external account. The account information may include an account identifier (e.g., account number) or other information that may be relevant to conducting a transfer of funds (e.g., verification values, etc.).

It is understood that while an exemplary case in which tokenized account information is utilized is described, embodiments are not so limited. For example, embodiments of the invention can implemented to utilized real account information instead. While this may forgo the need to manage tokenization processes, utilizing tokenized account information provides advantages including increased security. For example, even if any tokenized account information is intercepted at rest or in transmission, a malicious entity would not be able to utilize the intercepted information for any meaningful transaction.

At step 4, remote server computer 508 may generate and send a request to service provider network 510 to update the first external account and second external account according to the amount. In some embodiments, the request may be sent with information indicating the amount, the account information associated with the first external account, and the account information associated with the second external account. Upon receiving the request, service provider network 510 may initiate transfer of funds according to the amount. Service provider network 510 may determine, based on the received account information of the first external account (e.g., bank identification number (BIN) included in account number), that the authorization entity associated with authorization entity server computer 512 issued the first external account. Service provider network 510 may also determine, based on the received account information of the second external account, that the authorization entity associated with authorization entity server computer 516 issued the second external account associated with payment device 514.

At step 5, service provider network 510 may generate and send a request to authorization entity server computer 512 to update the first external account according to the amount. In some embodiments, the request may indicate to debit the amount from the first external account. Authorization entity server computer 512 may authorize the request in any suitable manner. In some embodiments, authorization entity server computer 512 may authorize the request based on verifying the account information associated with the first external account received from service provider network 510, as well as identifying that service provider network 510 is operated by a trusted entity. In other embodiments, authorization entity server computer 512 may additionally perform other authorization processes, such as contacting the first user associated with the first external account (e.g., by text message, email, in-app notification, etc.) for confirmation that the request is valid. Authorization entity server computer 512 may not proceed further if the request cannot be authorized. However, if the request can be authorized, authorization entity server computer 512 may update the first external account by decreasing a balance associated with the first external account by the amount.

At step 6, authorization entity server computer 512 may send service provider network 510 an indication that the request was authorized. In some embodiments, authorization entity server computer 512 may send confirmation information indicating that the amount was debited from the first external account. While not required, in some embodiments, a notification indicating that the amount was debited may also be sent to user device 502 operated by the first user associated with the first external account.

At step 7, based on authorization by authorization entity server computer 512, service provider network 510 may send instructions to update the second external account associated with payment device 514 to authorization entity server computer 516. Service provider network 510 may send instructions to authorization entity server computer 516 to push funds according to the amount to the second external account. Authorization entity server computer 516 may determine account information associated with the second external account that is stored in its systems and then update the information to indicate an increase in the balance corresponding to the second external account by the amount. Accordingly, payment device 514 may then be associated with an updated balance.

At step 8, service provider network 510 may receive, from authorization entity server computer 516, an indication that the amount was successfully added to the second external account associated with payment device 514. Service provider network 510 may receive information indicating the updated balance associated with payment device 514.

At step 9, remote server computer 508 may receive an indication that the amount was successfully added to the second external account associated with payment device 514. Remote server computer 508 may receive information indicating the updated balance associated with payment device 514.

At step 10, remote server computer 508 may send electronic toy bank 506 an indication that the amount was successfully added to the second external account, along with information indicating the updated balance associated with payment device 514. Electronic toy bank 506 may update its display to show the updated balance associated with payment device 514. This can show the second user that the amount written to transfer device 504 was successfully added to the second external account associated with payment device 514.

The second user may be able to conduct any suitable transaction utilizing payment device 514. The transaction method may be compatible with payment device 514, which may be a card (e.g., prepaid, debit, credit, etc.), mobile device (e.g., mobile phone, wearable device, etc.), or other suitable computing device. Exemplary types of transactions may include in-person transactions (e.g., magnetic stripe, contact, contactless, etc.) or online transactions (e.g., web, in-app, etc.).

In an exemplary case, the user may utilize payment device 514 to conduct transaction with a resource provider. A resource provider computer associated with the resource provider may send an indication that the transaction was conducted to remote server computer 508, which may provide payment processing services as described above. The resource provider computer may also send account information (e.g., account identifier) associated with payment device 514 and information associated with the transaction (e.g., timestamp, transaction amount, etc.) to remote server computer 508. Based on the information received from the resource provider computer, remote server computer 508 may determine that payment device 514 is associated with the second external account.

Remote server computer 508 may then determine whether the second external account is authorized to conduct the transaction. In some embodiments, remote server computer 508 may rely on information received in step 9 to determine that the second external account is associated with the updated balance. In some embodiments, remote server computer 508 may instead or additionally communicate with authorization entity server computer 512 to determine that the second external account is associated with the updated balance. If the transaction amount of the transaction does not exceed the updated balance associated with the second external account, the transaction may be authorized by authorization entity server computer 512.

The transaction may then proceed, causing the updated balance associated with the second external account to be decreased by the transaction amount. As a result, the second external account may then be associated with a second updated balance equivalent to the first updated balance received at step 9 decreased by the transaction amount.

Remote server computer 508 may further check information stored in its systems, particularly mobile application registration information, to determine whether the second external account is associated with any electronic toy bank. In this case, remote server computer 508 may determine that the second external account is associated with electronic toy bank 506. Remote server computer 508 may update information stored in its systems to indicate that the second external account, payment device 514 corresponding to the second external account, and electronic toy bank 506 are associated with the second updated balance. Remote server computer 508 may send the second updated balance to electronic toy bank 506, which may then update its display to display the second updated balance. This can show that the second user conducted a transaction utilizing the second external account and that payment device 514 is now associated with the second updated balance.

While not described explicitly with respect to FIG. 5, the second user may also save cash using electronic toy bank 506. For example, the second user may store cash in an interior storage compartment in electronic toy bank 506 (e.g., See 302 in FIG. 3) in addition to accumulating funds using transfer device 504. In some embodiments, electronic toy bank 506 may receive cash inserted through the slot (e.g., See 301 in FIG. 3), where the amount of cash inserted into the interior storage compartment may affect the information displayed by the display screen (e.g., 201 of FIG. 1) of electronic toy bank 506.

In some embodiments, electronic toy bank 506 may separately display a first balance associated with payment device 514 and a second balance associated with the cash in the interior storage compartment. For example, whenever the amount of cash in the interior storage compartment is changed, such as when cash is withdrawn from or added to the interior storage compartment, electronic toy bank 506 may determine the total amount of cash in the interior storage compartment. Electronic toy bank 506 may then display the total amount of cash in the interior storage compartment on the display screen.

In another exemplary case, the amount corresponding to the inserted cash may be added to the second external account associated with payment device 514. Electronic toy bank 506 may determine the amount of cash that was inserted through the slot and send remote server computer 508 information indicating the determined amount of cash. Remote server computer 508 may then determine that payment device 514 is associated with an updated balance according to the inserted cash, where the updated balance may be the result of increasing a previous balance associated with payment device 514 with the determined amount of cash. Remote server computer 508 may send information indicating the updated balance to electronic toy bank 506, which may display, by the display screen, the updated balance associated with payment device 514.

In this exemplary case, the insertion of cash into electronic toy bank 506 may simulate a deposit of money into the second external account associated with payment device 514. Thus, electronic toy bank 506 can be configured so that the cash stored inside the interior storage compartment may not be accessed by the second user. For example, the interior storage compartment may be locked with a key to which only the first user may have access.

Embodiments of the invention solve issues presented by traditional toy banks. For example, traditional toy banks only allow the child to conduct cash transactions based on their savings, which is limiting. Another issue of traditional toy banks is that the child does not receive convenient access to their saved money because most of the time, the child may not have their saved cash with them. Thus, even if the child is interested in utilizing their savings to conduct a transaction, they may not be able to get the necessary money if their toy bank is in a remote location (e.g., at home). Further, traditional toy banks tend to accumulate small change (e.g., coins), which is inconvenient to carry around and utilize for payments. In contrast, embodiments of the invention allow the child to utilize any suitable payment device (e.g., card, mobile phone, etc.) associated with their electronic toy bank to conduct transactions, so that they are not limited to cash transactions and do not need to carry their saved cash.

Managing funds utilizing an electronic toy bank can help a child learn about aspects of money management that cannot be learned based on use of traditional toy banks. For example, the child can learn about management of different types of currency, such as digital currency, and be exposed to various payment devices, such as payment cards. Thus, an electronic toy bank can allow a child to experience more realistic usages of saved funds, which is not possible when utilizing a traditional toy bank.

It is also noted that embodiments of the invention can be implemented even when the second user does not have their own bank account. For example, the second external account associated with the payment device may be a prepaid card account or a sub-account of the first external account associated with the first user. This may be especially useful in cases in which the second user is not able to utilize their own bank account. Thus, a child that is not yet allowed to open their own bank account can still experience saving and managing cash and digital currency, as well as utilizing their own payment device to conduct transactions.

Embodiments of the invention can also be utilized in various other scenarios besides a saving mechanism. One exemplary scenario is that embodiments of the invention can be utilized to conduct fund raising processes. The electronic toy bank may be registered to a recipient external account for collecting donations for a certain entity. One or more donors may donate to the recipient external account by interacting with the electronic toy bank. For example, a donor may contribute a donation by utilizing their user device to write information indicating a donation amount to a transfer device, which can then be tapped at the electronic toy bank to initiate transfer of funds from the donor's external account to the recipient external account to fulfill the donation. As described above, in some cases, the donor may forgo the use of the transfer device and may utilize their user device to directly communicate the donation information to the electronic toy bank.

Embodiments of the invention described above solve certain issues with conventional donation processes. For example, typically, individuals often are not open to providing donations on the whim due to inconvenience and security reasons. This is because it is cumbersome and time consuming to provide payment information orally. Further, directly providing payment information to an unknown entity may be cause for potential fraud. In contrast, embodiments of the invention enable a donor to provide a donation with a quick and easy action (e.g., tapping transfer device or user device at the electronic toy bank). Additionally, payment information may be obfuscated and protected in the form of tokenized payment information. Thus, embodiments of the invention can enable a donation process that may encourage more individuals to donate.

The above process regarding implementation of a donation process may also be applied to situations in which an entity is providing resources to buyers in exchange for payment. In this case, the electronic toy bank may be registered to an external account associated with a resource provider, while buyers may interact with the electronic toy bank utilizing a transfer device or their user device to pay for a resource. For example, the resource provider may be a child running a lemonade stand, while the buyers may interact with the electronic toy bank to add money to the child's external account to purchase lemonade. This can bring more business to the resource provider, since individuals that do not have cash on them are still able to make purchases. An additional advantage is that the resource provider is capable of providing business involving cashless transactions without having to own other payment device reader devices, which may not be accessible due to costs and other reasons.

While embodiments in which the electronic toy bank displays balance information associated with the external account of the user operating the transfer device and the payment device are described above, embodiments are not so limited. In some cases, the electronic toy bank may be utilized to display information related to the external account from which funds are debited. An exemplary scenario is described below.

Embodiments of the invention can be utilized to conduct a game. For example, the game may be in the form of a treasure hunt involving multiple players and multiple electronic toy banks. The electronic toy banks may be associated with a prize fund account, where the goal is for the players to find as many electronic toy banks as possible to get money transferred from the prize fund account into their own payment accounts. The electronic toy banks may display the same or different values depending on the design of the game. The game organizers may provide each player with a transfer device that is registered with payment account information associated with the player. It is understood that in other embodiments, each player may utilize their own user device instead of a transfer device.

During the course of the game, when a player finds an electronic toy bank, the player can touch their token against the electronic toy bank. The electronic toy bank can then initiate transfer of an amount from the prize fund account to the player's payment account based on information stored in their transfer device. In some embodiments, the electronic toy bank may update its display to show an updated balance associated with the electronic toy bank. In some cases, the updated balance may reflect the prize funds that are still available for players to claim from the electronic toy bank. At a later time, the player may then be able to utilize the amount transferred to their payment account using a corresponding payment device.

While embodiments in which funds are transferred between external accounts are described in detail above, it is understood that embodiments are not so limited. For example, embodiments of the invention can be applied to other suitable forms of balances, such as those for points or rewards. Remote server computer 508 may then be able to manage information associated with points or rewards associated with external accounts, instead of or in addition to cash balances.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other user devices.

The subsystems in a computer system may be interconnected via a system bus. Additional subsystems can include a printer, keyboard, storage device(s), monitor, which is coupled to a display adapter, and others. Peripherals and input/output (I/O) devices, which couple to an I/O controller, can be connected to the computer system by any number of means known in the art such as an input/output (I/O) port (e.g., USB, FireWire®). For example, the I/O port or external interface (e.g. Ethernet, Wi-Fi, etc.) can be used to connect the computer system to a wide area network such as the Internet, a mouse input device, or a scanner. An interconnection via system bus can allow the central processor to communicate with each subsystem and to control the execution of instructions from system memory or the storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. An electronic toy bank comprising:
a housing;
a processor embedded in the housing;
a display screen coupled to the processor and configured to display information corresponding to a payment device associated with the electronic toy bank;
a sensor coupled to the processor and comprising a communication interface, the sensor configured to use the communication interface to sense when an electronic transfer device including a contactless interface is proximate to the housing, the sensor further configured to use the communication interface to determine data including an amount from the contactless interface of the electronic transfer device using a near-field communication protocol;
a network interface coupled to the processor and configured to communicate with a remote server computer; and
a memory coupled to the processor and programmed to cause the electronic toy bank to send instructions to the remote server computer to update an external account according to the amount.

2. The electronic toy bank of claim 1, wherein the electronic toy bank is in the form of an animated character or animal.

3. The electronic toy bank of claim 1, wherein the housing comprises a soft or plush surface.

4. The electronic toy bank of claim 1, wherein the housing comprises a hard surface.

5. The electronic toy bank of claim 1, further comprising:
a speaker coupled to the processor and configured to play a sound of coins dropping when the sensor senses the transfer device.

6. The electronic toy bank of claim 1, wherein the housing comprises an interior storage compartment for cash and a slot configured to receive the cash.

7. The electronic toy bank of claim 6, wherein the memory is programmed to display a total amount of cash in the interior storage compartment on the display screen.

8. The electronic toy bank of claim 1, wherein the external account is a first external account, and wherein the memory is programmed to cause the electronic toy bank to further send instructions to update a second external account associated with the payment device.

9. The electronic toy bank of claim 8, wherein the memory is programmed to cause the electronic toy bank to debit the amount from the first external account and increase a balance corresponding to the second external account by the amount so that the payment device is associated with an updated balance.

10. The electronic toy bank of claim 9, wherein the memory is programmed to display the updated balance associated with the payment device on the display screen.

11. A method for using an electronic toy bank comprising:
sensing, by a sensor of an electronic toy bank, that an electronic transfer device including a contactless interface is proximate using a communication interface of the sensor;
determining, by the electronic toy bank using the communication interface of the sensor, data including an amount from the contactless interface of the electronic transfer device using a near-field communication protocol;
sending, by a network interface of the electronic toy bank, instructions to a remote server computer to update an external account according to the amount; and
displaying, by a display screen of the electronic toy bank, information corresponding to a payment device associated with the electronic toy bank.

12. The method of claim 11, wherein the electronic toy bank is in the form of an animated character or animal.

13. The method of claim 11, wherein the electronic transfer device is a keychain device in the form of a coin or bill.

14. The method of claim 11, further comprising:
playing, by a speaker of the electronic toy bank, a sound of coins dropping when the sensor senses that the electronic transfer device is proximate.

15. The method of claim 11, wherein the external account is a first external account, further comprising:
sending, by the electronic toy bank, instructions to update a second external account associated with the payment device.

16. The method of claim 15, further comprising:
sending, by the electronic toy bank, instructions to debit the amount from the first external account; and
sending, by the electronic toy bank, instructions to increase a balance corresponding to the second external account by the amount so that the payment device is associated with an updated balance.

17. The method of claim 16, further comprising:
displaying, by the electronic toy bank, the updated balance associated with the payment device on the display screen.

18. The method of claim 17, wherein the amount is a first amount and wherein the updated balance is a first updated balance, further comprising:

receiving, by the electronic toy bank from the remote server computer, an indication that a transaction of a second amount was conducted using the payment device, wherein the first updated balance is decreased by the second amount resulting in a second updated balance associated with the payment device;

receiving, by the electronic toy bank from the remote server computer, the second updated balance associated with the payment device; and displaying, by the display screen of the electronic toy bank, the second updated balance associated with the payment device.

19. The method of claim 11, wherein the electronic toy bank includes a housing comprising an interior storage compartment and a slot, further comprising:

receiving, by the interior storage compartment, cash inserted through the slot;

determining, by the electronic toy bank, a total amount of cash in the interior storage compartment; and displaying, by the electronic toy bank, the total amount of cash in the interior storage compartment on the display screen.

20. The method of claim 11, wherein the electronic toy bank includes a housing comprising an interior storage compartment and a slot, and wherein the method further comprises:

receiving, by the interior storage compartment, cash inserted through the slot;

determining, by the electronic toy bank, an amount of cash inserted through the slot;

sending, by the electronic toy bank, the amount of cash to the remote server computer, wherein the remote server computer determines an updated balance associated with the payment device according to the amount of cash;

receiving, by the electronic toy bank, the updated balance associated with the payment device from the remote server computer; and displaying, by the display screen, the updated balance associated with the payment device.

* * * * *